Patented May 26, 1936

2,042,338

UNITED STATES PATENT OFFICE 2,042,338

MANUFACTURE OF PIGMENTED PAPER

John J. Healy, Jr., Newton Upper Falls, Mass., assignor to Merrimac Chemical Company, Everett, Mass., a corporation of Massachusetts No Drawing. Application February 3, 1934, Serial No. 709,593

5 Claims. (Cl. 92—21)

This invention relates to the manufacture of pigmented paper and it has particular application to the manufacture of paper wherein zinc sulphide is employed either alone or in admixture with clay or the like.

According to present day practice, clay is commonly employed as a pigment in the manufacture of white paper. It serves not only as a pigment but also as a filling agent. Clay to be used for this purpose must of necessity be of good white color and uniform fine texture. These properties in clay are not common and accordingly the cost thereof is relatively high. Furthermore, in order to produce the desired quality of paper, relatively large amounts of clay are required.

It has been proposed heretofore to employ zinc sulphide as a substitute for clay. Unlike clay this material is produced chemically of readily available constituents and it enjoys the further advantage in that comparatively small amounts are necessary to produce the desired degree of pigmentation. On the other hand, due to its reactivity it sometimes suffers the disadvantage of discoloration which is very noticeable when employed under conditions which prevail in the manufacture of paper wherein clay is now utilized.

To illustrate: 125 parts of pulp are suspended in the usual manner in water and intimately mixed with approximately 6.25 parts of commercial zinc sulphide pigment whereupon the mixture is sized by adding 2% of sodium resinate, based on the weight of the pulp, and approximately 2% by weight of alum to precipitate the resinate, after which a sheet is formed therefrom. Apparently the sheet made under these conditions is inherently susceptible to discoloration, particularly when exposed to metals such as copper and solutions of acid reacting electrolytes, though the discoloration is not always manifest. A clay filled paper made under the same conditions remains perfectly white.

I have now found that the discoloration may be obviated effectively and that a product having inordinate durability as well as whiteness is obtainable provided the compounding of the paper is effected under controlled conditions, the details of which are hereinafter set forth.

According to the present invention a product having excellent color and durability is obtained by the addition of a small amount of basic alumina, preferably in the form of sodium aluminate, whereby the pH value of the pulp is raised from approximately 4.2 to more than 5 and preferably between 5.5 and 7. In practicing my invention the pulp is mixed with the rosin size in the usual manner after which the alum is added to precipitate the size. Thereafter sufficient sodium aluminate is added to produce a pH of 5.5 or more and the zinc sulphide pigment is then introduced. For the purpose of my invention .75% of sodium aluminate, based on the weight of the pulp, will be found sufficient and practically no discoloration will be observed. By increasing the amount of sodium aluminate to approximately .87% no discoloration whatsoever has been noted. I have added as much as 1.25% of sodium aluminate whereby a pH of 7.6 is produced with the result that the product appeared to be well sized and was of excellent shade.

The function of the sodium aluminate in preserving and in fact improving the pigment quality of the zinc sulphide is not clearly understood, although it appears to be dependent upon conditions which afford good sizing while avoiding the acid conditions which obtain when alum alone is employed as the source of alumina. The preferred range is between 5.5 and 7.6. The higher limits produce satisfactory results but since they necessitate substantially greater quantities of sodium aluminate the ultimate product is more expensive. Moreover, a paper product of good quality may be obtained at a lower pH value within the aforementioned range.

The following specific example illustrates one embodiment of my invention:

125 parts by weight of pulp are beaten with water to the usual consistency after which 2.5 parts of sodium resinate, which has previously been dispersed in water, is added. The size is precipitated in the usual manner as by adding approximately 2.5 parts of paper makers' alum.

The resultant mixture has a pH of about 4.3. To adjust the pH of the mix preparatory for the addition of the sulphide pigment, .66% by weight of sodium aluminate, based on the amount of pulp, is introduced whereby a pH of 4.9 is obtained. Thereupon .25 parts of zinc sulphide are added; very little discoloration is evident under these conditions. By increasing the amount of sodium aluminate to .85% a pulp having a pH of 5.45 is produced which may be handled under the usual paper manufacturing conditions with perfect safety and no apparent discoloration.

It is to be understood that the precise order of adding the ingredients may be varied. Thus, the sulphide may be added before or during the addition of the alum, care being exercised to avoid commingling of the pigment with an aqueous medium of high acidity. In this connection good sizing can be realized with the aid of sodium aluminate and alum at a pH which is more nearly neutral than when alum alone is employed as is described, for example, in United States Patent 1,885,185.

The relative amounts of sodium resinate, alum, and sodium aluminate may be varied as is well understood by those skilled in the art provided the ultimate pH value of the mix falls within the range hereinabove specified. It is likewise to be noted that other materials may be incorporated and that the point at which the sodium aluminate and pigment are added by the paper manufacturer is optional, although it is particularly convenient to add the same in the paper beater. Other soaps than sodium resinate may be employed and the nature of the pulp may be modified and mixed with other fibers as is well understood by those skilled in this art.

Although I have described one specific example of the application of the principles of my invention and have indicated the effect of variables, it is to be understood that the invention is not restricted to the precise embodiment set forth except as indicated by the appended claims.

What I claim is:

1. A process of making paper, comprising precipitating rosin size upon paper pulp suspended in water, by adding aluminum sulphate thereto in an amount to obtain precipitation of the rosin and an acidity of the water substantially greater than neutrality, subsequently adding sodium aluminate to obtain substantial neutrality of the water, adding zinc sulphide pigment to the pulp and collecting the pulp as a paper web.

2. A method of manufacturing paper which comprises admixing paper pulp, rosin sizing and zinc sulphide with water and precipitating the sizing upon the pulp with aluminum sulphate and sodium aluminate, the ratios of the two being so adjusted as to obtain a pH value of approximately 5–7.6 whereby discoloration of the product due to decomposition of the zinc sulphide is obviated.

3. A method of manufacturing paper which comprises admixing paper pulp, sizing and zinc sulphide with water, a sizing operation being effected by adding sodium aluminate and aluminum sulphate in a ratio to obtain a pH value of the mixture of approximately 5–7.6, the zinc sulphide being added to the stock after the sizing has been added and the pH value adjusted within the desired limits, whereby discoloration of the product due to reaction of zinc sulphide is eliminated.

4. A method of manufacturing paper which comprises admixing paper pulp, sizing and zinc sulphide with water, a sizing operation being effected by adding aluminum sulphate and sodium aluminate in a ratio to obtain a pH value of the mixture of approximately 5–7.6.

5. In the manufacture of a sized paper containing a zinc sulphide filler or pigment and where aluminum sulphate is employed in the sizing operation, the method of avoiding discoloration and related objectionable manifestations incident to the presence of the zinc sulphide filler, characterized by the addition of sodium aluminate in sufficient quantity to bring the pH value within approximately the range of 4.9 to 7.6.

JOHN J. HEALY, JR.